(12) United States Patent
Choi et al.

(10) Patent No.: US 8,700,621 B1
(45) Date of Patent: Apr. 15, 2014

(54) GENERATING QUERY SUGGESTIONS FROM USER GENERATED CONTENT

(75) Inventors: Yung Choi, Seoul (KR); Eun Yeong Ahn, State College, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/425,068

(22) Filed: Mar. 20, 2012

(51) Int. Cl.
*G06F 7/00* (2006.01)

(52) U.S. Cl.
USPC .......................................... 707/730; 707/767

(58) Field of Classification Search
None
See application file for complete search history.

(56) References Cited

U.S. PATENT DOCUMENTS

| | | | |
|---|---|---|---|
| 6,078,866 A | 6/2000 | Buck et al. | |
| 7,917,489 B2 * | 3/2011 | Mukherjee et al. | 707/707 |
| 2004/0117323 A1 | 6/2004 | Mindala | |
| 2006/0059135 A1 | 3/2006 | Palmon et al. | |
| 2008/0071687 A1 | 3/2008 | Hengel | |
| 2009/0248666 A1 * | 10/2009 | Ahluwalia | 707/5 |
| 2011/0191180 A1 | 8/2011 | Blackhurst et al. | |
| 2012/0030228 A1 * | 2/2012 | Naidu et al. | 707/767 |

OTHER PUBLICATIONS

U.S. Appl. No. 13/230,391, filed Sep. 12, 2001.
U.S. Appl. No. 12/950,655, filed Nov. 19, 2010.
U.S. Appl. No. 13/081,033, filed Apr. 6, 2011.
U.S. Appl. No. 13/226,333, filed Sep. 6, 2011.
U.S. Appl. No. 13/045,973, filed Mar. 11, 2011.
U.S. Appl. No. 13/565,777, filed Aug. 2, 2012.
U.S. Appli. No. 13/600,194, filed Aug. 30, 2012.
Internet Article: eBay: Turbo Lister FAQ—Seller Tools retrieved from http://pages.ebay.com.turbolister, http://pages.ebay.com/turbolister2/faq.html, pp. 1-4, Nov. 30, 2010.
Internet Aricle: eBay: Turbo Lister—Seller Tools—List Multiple Items and Upload to eBay in Bulk!, http://pages.ebay.com/turbo_lister, pp. 1-2, Nov. 30, 2010.
eBay—Turbo Lister Listing Activity Quick Start Guide, *eBay File Exchange Catalog Listing Template Instructions*, Ver. 1.1, pp. 1-8, Apr. 1, 2007.
Liu et al., Clustering Billions of Images with Large Scale Nearest Neighbor Search, *IEEE Workshop on Applications of Computer Vision (WACV'07)*, pp. 1-6, Jan. 1, 2007.
U.S. Appl. No. 13/664,385 to Gundapaneni et al. filed Oct. 30, 2012.
Copenheaver, B., International Search Report and Written Opinion issued in International Application No. PCT/IN2012/000497, pp. 1-16, Dec. 6, 2012.

* cited by examiner

*Primary Examiner* — Robert Beausoliel, Jr.
*Assistant Examiner* — Nirav K Khakhar
(74) *Attorney, Agent, or Firm* — Johnson, Marcou & Isaacs, LLC

(57) ABSTRACT

An improved query suggestion system can allow a user to more effectively search for items they would like to purchase online. The present invention provides a computer-implemented method for generating query suggestions based on user-generated content. A user may begin an online shopping venture by entering a keyword into the search function on a shopping website or other search engine interface. The search engine can launch a search of user generated content on the Internet, such as product related blogs, product reviews, or question-and-answer articles. The search engine can extract frequently repeated bigrams from the content. The search engine may combine the bigrams to generate candidate composite words and select a final query suggestion list from the candidate words. The query suggestion list is displayed to the user in the search interface. The user may select one of the suggested queries if it more accurately defines his search.

20 Claims, 3 Drawing Sheets

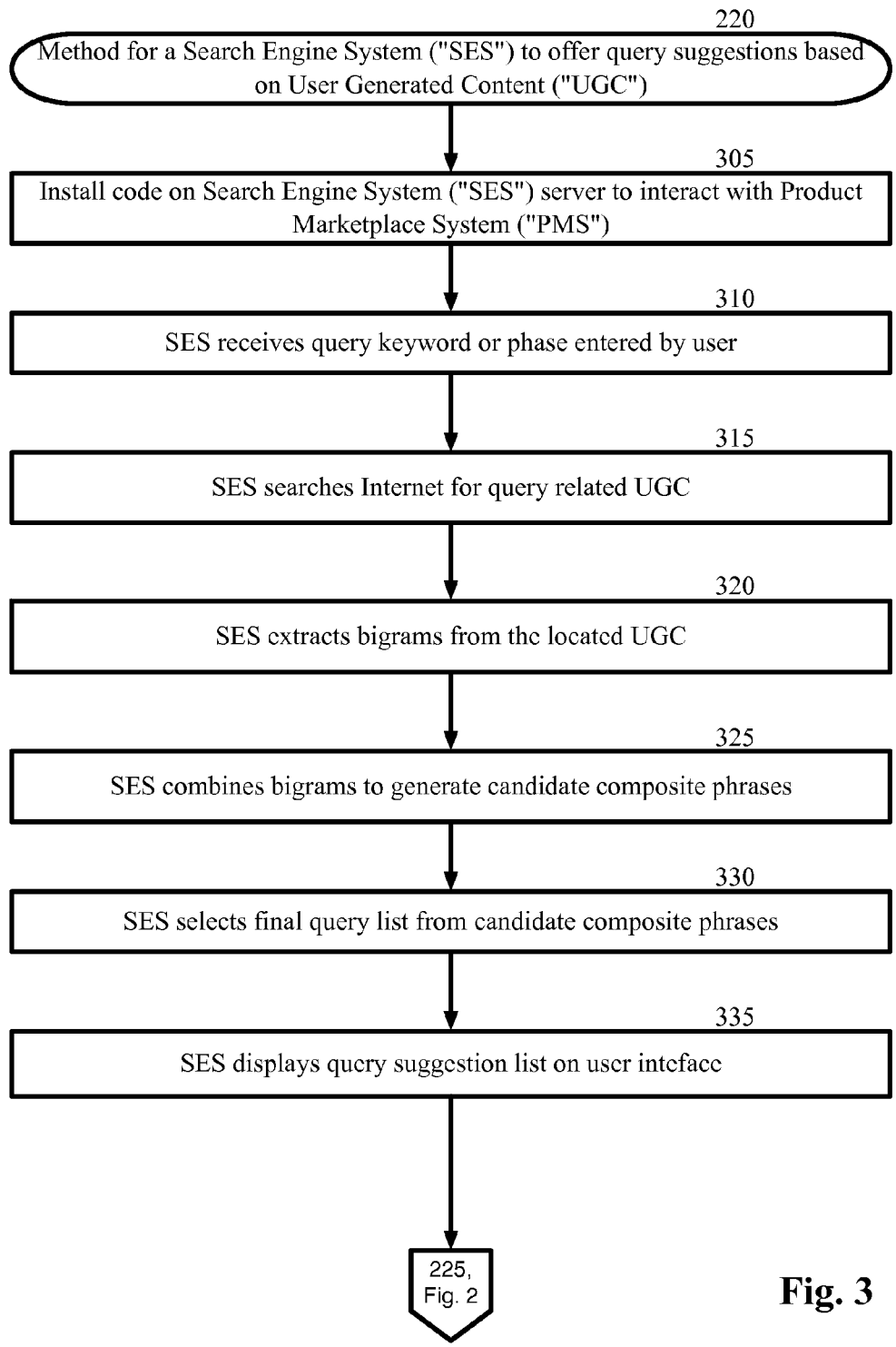

GENERATING QUERY SUGGESTIONS FROM USER GENERATED CONTENT

TECHNICAL FIELD

The present disclosure relates to online query suggestions, and more particularly to a method for generating query suggestions from user generated content.

BACKGROUND

The retail market has seen a significant amount of growth in online shopping since the advent of the Internet. On the Internet, users may search for, locate, and purchase nearly everything that can be purchased at a physical marketplace.

The difficulty for online shoppers has become identifying the product that they would like to purchase. With the rapidly multiplying outlets for purchasing products available online and the abundance of competing brands and model numbers within a brand, it can be difficult for a shopper to locate the product that he desires.

In many existing shopping search engines, the user will enter one or more keywords, and the search engine will offer a number of suggested queries to assist the user. The user may select one of the queries to enhance his search, or he may ignore them and continue the search with his own keyword selection. Currently, many search engines gather the suggested queries from the previous queries of other shoppers. However, these query suggestions based on historical search entries may not be effective as many shoppers are not knowledgeable enough about the product to enter useful queries. As a result, ineffective searches are repeated again and again by subsequent users.

SUMMARY

An aspect of the present invention provides a computer-implemented method for generating query suggestions based on User Generated Content ("UGC"). A Search Engine System ("SES") can install code on the SES server to interact with the Online Shopping System ("OSS"). A user may begin an online shopping venture by entering a keyword into the search function on a shopping website or other search engine interface. The SES can launch a search of UGC on the Internet, such as product related blogs, product reviews, question-and-answer articles, and other user generated content relating to the product. The SES can extract frequently repeated bigrams from the UGC. The SES may combine the bigrams to generate candidate composite words and select a final query suggestion list from the candidate words. The query suggestion list is displayed to the user in the search interface. The user may select one of the suggested queries if it more accurately defines his search.

Another aspect of the present invention provides a computer program product that is installed on a server located in an SES for generating query suggestions based on UGC. The computer program product includes a non-transitory computer-readable storage device having computer-readable program instructions stored therein. The computer-readable program instructions include computer program instructions for recognizing a keyword or phrase entered by a user of the search engine interface; searching the Internet for UGC; extracting bigrams from the UGC; combining the bigrams to generate candidate composite words; selecting a final query suggestion list; and displaying the query suggestion list to the user.

Another aspect of the present invention provides an apparatus for generating query suggestions based on UGC. The apparatus includes an SES user interface displayed on an OSS web browser application. The SES is configured for offering query suggestions to a user when the user enters a keyword or phrase into the search engine interface. The apparatus includes an SES server configured for recognizing a keyword or phrase entered by a user of the search engine interface; searching the Internet for UGC; extracting bigrams from the UGC; combining the bigrams to generate candidate composite words; selecting a final query suggestion list; and displaying the query suggestion list to the user.

BRIEF DESCRIPTION OF THE DRAWINGS

FIG. 3 is a block flow diagram depicting a method for a search engine system to offer query suggestions based on user-generated content, in accordance with certain exemplary embodiments.

DETAILED DESCRIPTION OF THE EXEMPLARY EMBODIMENTS

Overview

Figure 1:
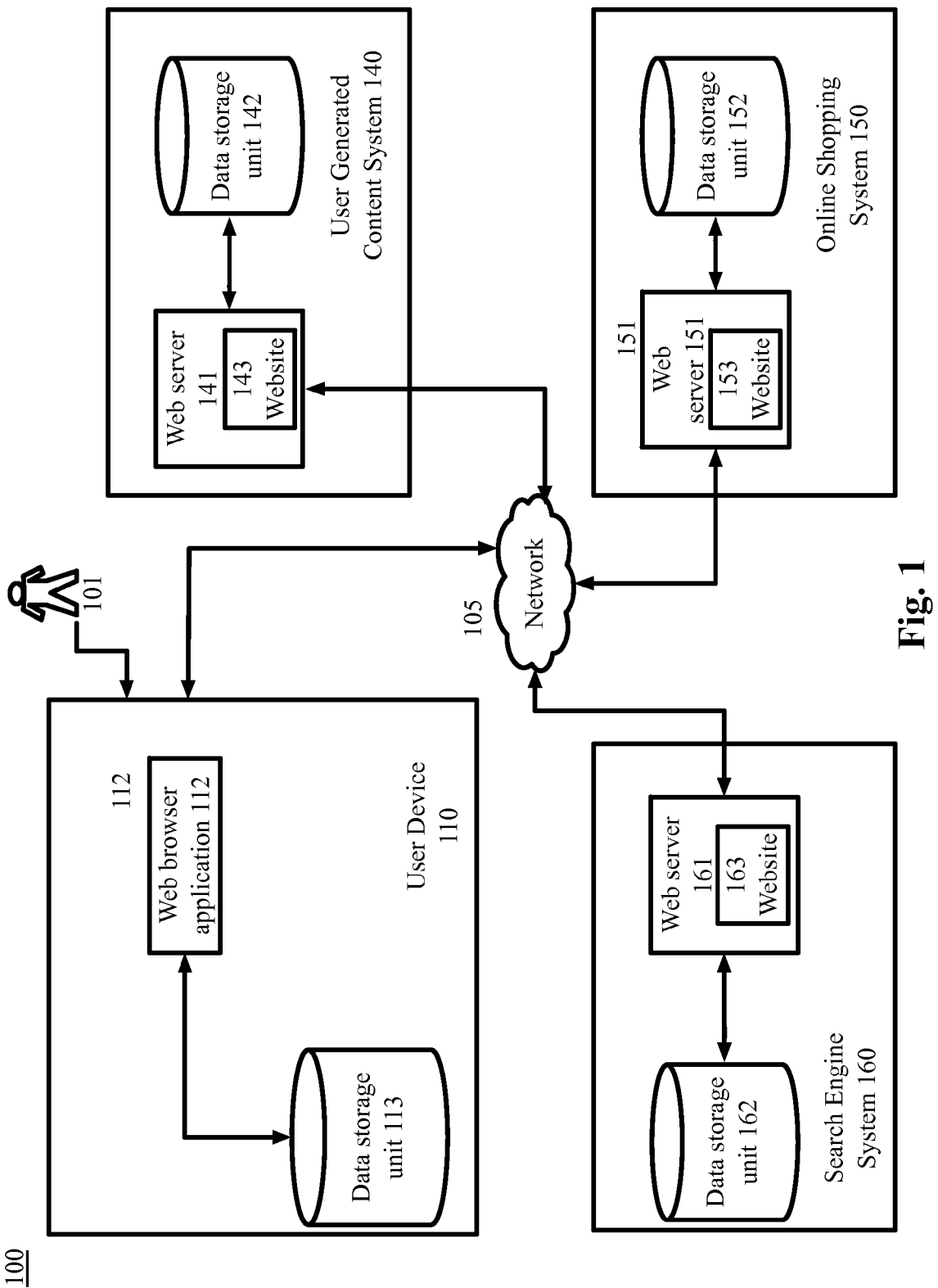
FIG. 1 is a block diagram depicting a system for offering query suggestions based on user generated content, in accordance with certain exemplary embodiments.

The exemplary embodiments provide a Search Engine System ("SES") that is operating on an online shopping website. The SES may employ a user interface to allow a user to enter keywords or phrases into the SES. The keywords may be a single word relating to the product for which the user would like to shop, two or more related words, or a phrase relating to the product. As used throughout the specification, any combination of one or more keywords or phrases will be referred to simply as "keywords". A user may open the online shopping website and enter keywords related to the product on the SES interface. As used throughout the specification, the term "product(s)" should be interpreted to include tangible and intangible products, as well as services.

The SES searches the Internet for User Generated Content ("UGC") based on the keywords entered by the user. UGC may refer to any content created by users of the product. The content may be in the form of blogs about the product, user reviews of the product, question and answer sections of a website about the product, or any other product-related content that might be generated by a user of the product.

The SES can extract bigrams from the UGC. The extracted bigrams may be two word combinations that occur most frequently in the UGC. The exemplary embodiment may require that the number of occurrences of the bigrams be above a minimum threshold to be included in the extracted bigram list. In alternate exemplary embodiments of the invention, the SES may extract words or phrases other than two word bigrams. The SES may extract single word unigrams, three word trigrams, or any other length that the SES may find useful for this method.

The SES generates a list of composite phrases by combining the bigrams into different order combinations. That is, the words of each bigram are repeatedly combined with one or more words from other extracted bigrams to form new composite phrases. When a duplicate to an existing composite phrase is generated, the SES eliminates the duplicate. The SES evaluates the relevance of each new composite phrase. The SES may evaluate the relevance by counting the number of occurrences in the results of the original keywords search. The composite phrases are sorted by the SES according to the count of the occurrences, originality of words contained in the composite phrase, or other factors affecting the relevance and usefulness of the suggested queries. The SES may additionally use the process to generate new composite phrases of three or more words.

The SES selects a predetermined number of the composite phrases to present to the user as query suggestions. The SES may determine the number of composite phrases to present based on the space provided by the website on which the SES is operating, the number of useful composite phrases generated, ease of use for the user, or any other criteria that might determine the useful number of query suggestions. The SES presents the selected query suggestions to the user in the user interface or on the OSS website.

The SES may be implemented as a server operating in the SES. The SES can interact with the web browser application of the Online Shopping System ("OSS") or be embodied as a companion application of the web browser application and execute within the web browser application.

Turning now to the drawings, in which like numerals represent like (but not necessarily identical) elements throughout the figures, exemplary embodiments of the invention are described in detail.

System Architecture

FIG. 1 is a block diagram depicting an operating environment 100 for a SES 160, in accordance with certain exemplary embodiments.

Referring to FIG. 1, the system 100 includes network devices, such as a User Generated Content ("UGC") system 140, an Online Shopping System ("OSS") 150, a Search Engine System ("SES") 160, and a user network device 110 associated with a user 101. Each of the network devices 110, 140, 160, 150 is configured to communication with other network devices via a network 105.

The user device 110 may be a mobile device, (for example, notebook computer, tablet computer, netbook computer, personal digital assistant (PDA), video game device, GPS locator device, cellular telephone, smartphone, or other mobile device), a personal computer, or other appropriate technology that includes or is coupled to a web browser application module 112, such as GOOGLE'S CHROME, MICROSOFT'S INTERNET EXPLORER, or MOZILLA'S FIREFOX. Although depicted in FIG. 1 as a web browser application 112, the web browser application 112 may be implemented as non-browser type application on the user device 110, where the application can communicate information to and receive information from the network 105.

In certain exemplary embodiments, the web browser application 112 is an HTML5 compliant web browser. HTML5 compliant web browsers include a cross-document messaging application programming interface (API) and a local storage API that previous HTML versions did not have. The cross-document messaging API of HTML5 compliant web browsers enables documents, such as web pages, to communicate with each other. For example, a first document can send a message to a second document requesting information. In response, the second document can send a message including the requested information to the first document. The local storage API of HTML5 compliant web browsers enables the web browser to store information on a client device upon which the web browser is installed or is executing, such as the user device 110. Websites also can employ the local storage API to store information on a client device. Other web browsers having cross-document messaging and/or local storage capabilities also may be used in certain exemplary embodiments.

The user 101 can use the web browser application 112 to view, download, upload, or otherwise access documents or web pages via a distributed network 105.

The network 105 includes a wired or wireless telecommunication system or device by which network devices (including devices 110, 140, 150, and 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of exemplary embodiments, it should be understood that the terms "data" and "information" are used interchangeably herein to refer to text, images, audio, video, or any other form of information that can exist in a computer based environment.

The web browser application 112 can interact with web servers (or other computing devices) connected to the network 105, the web server 141 of the UGC system 140, the web server 151 of the OSS 150, and the web server 161 of the SES 160.

The SES 160 can be used to search the Internet for websites and other Internet accessible data for the purpose of online shopping or other online searching functions. The SES 160 may collect the websites or other online locations of the searched product and display the results to the user. The SES server 161 represents the computer-implemented system that the SES 160 employs to perform Internet searches. The SES server 161 can include a set of computer-readable program instructions, for example, using JavaScript, that enable the SES 160 to interact with the OSS 150 and the UGC system 140 to search documents, websites, and other data, and submit search results and query suggestions. The SES website 163 may represent any web-based interface that allows users to interact with the SES 160 to enter search data and choose from query suggestions. The SES 160 user interface can interact with the website application of the OSS 150 or be embodied as a companion application of the website application and execute within the website application. In certain exemplary embodiments, the SES 160 can be implemented in a stand-alone configuration in which the user 101 can search multiple merchant online shopping systems 150.

The user device 110 includes a data storage unit 113 accessible by the web browser application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The OSS 150 utilizes an OSS server 151. The OSS server 151 may represent the computer implemented system that the OSS 150 employs to configure user accounts, create the online marketplace, host the SES 160 interface, communicate with the SES 160, and complete transactions with the user device 110. The OSS website 153 may represent any web-based interface that allows users to interact with the OSS 150 to search for products, browse products, and make purchases. The OSS 150 may include a data storage unit 152 accessible by the server 151 of the OSS 150. The data storage unit 152 can include one or more tangible computer-readable storage devices.

The UGC system 140 can employ a UGC system web server 141. The server 141 may represent the computer implemented system that the UGC system 140 employs to host the UGC system website 143. The UGC system website 143 may host the UGC for which the SES 160 is searching. The UGC may be blogs, user reviews, question and answer articles, or other content that is related to the product being searched and is created by users or reviewers of the product. The UGC system 140 may include a data storage unit 142 accessible by server 141 of the UGC system 140. The data storage unit 142 can include one or more tangible computer-readable storage devices.

It will be appreciated that the network connections shown are exemplary and other means of establishing a communications link between the computers and devices can be used. Moreover, those having ordinary skill in the art having the benefit of the present disclosure will appreciate that the user device 110, UGC system 140, OSS 150, and SES 160 illustrated in FIG. 1 can have any of several other suitable computer system configurations. For example, a user device 110 embodied as a mobile phone or handheld computer may not include all the components described above.

System Process

The components of the exemplary operating environment 100 are described hereinafter with reference to the exemplary methods illustrated in FIGS. 2-3. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

Figure 2:
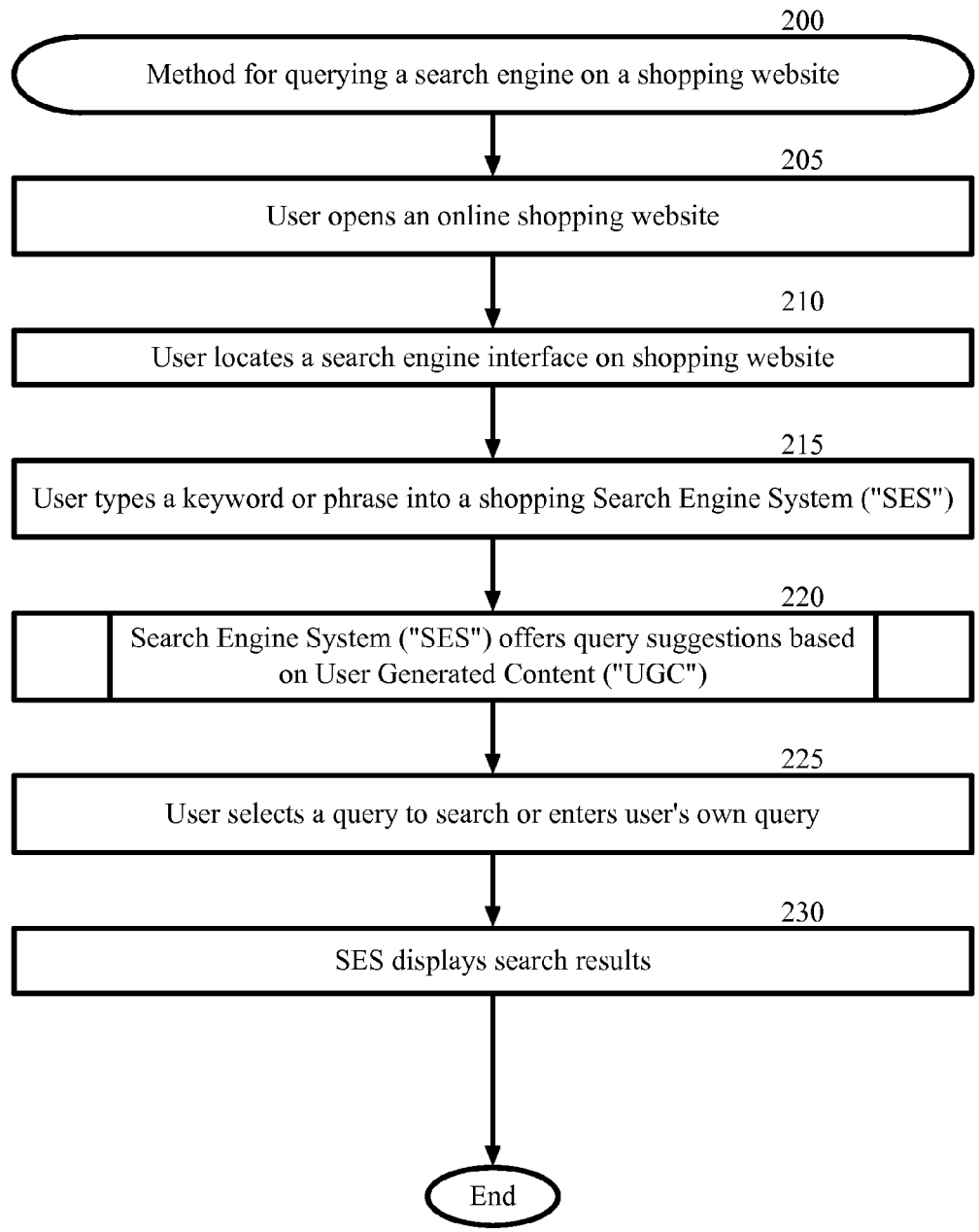
FIG. 2 is a block flow diagram depicting a method for querying a search engine on a shopping website via query suggestions based on user generated content, in accordance with certain exemplary embodiments.

FIG. 2 is a flow chart depicting a method 200 for querying a search engine on a shopping website, in accordance with certain exemplary embodiments.

With reference to FIGS. 1 and 2, in block 205, the user 101 opens a website 153 on an Online Shopping System ("OSS") 150. The user may access the website 153 by a mobile device, (for example, notebook computer, tablet computer, netbook computer, personal digital assistant (PDA), video game device, GPS locator device, cellular telephone, smartphone, or other mobile device), a personal computer, or other appropriate technology that includes or is coupled to a web browser application module 112, such as GOOGLE'S CHROME, MICROSOFT'S INTERNET EXPLORER, or MOZILLA'S FIREFOX.

In block 210, the user 101 locates a search engine user interface on the shopping website 153. The search engine system 160 may be embodied as a companion application of the website 153 and execute within the website 153 application. Alternatively, in an alternate embodiment, the website 153 may simply host the user interface of the SES 160 and allow the SES 160 to operate as a separate application.

In block 215, the user 101 utilizes a user interface of the website 153 to enter a keyword or phrase relating to the item for which they are searching. The keywords may be a single word relating to the product for which the user would like to shop, two or more related words, or a phrase relating to the product. As used throughout the specification, any combination of one or more keywords or phrases will be referred to simply as "keywords".

In block 220, the SES 160 offers the user 101 suggestions for alternate or additional keyword queries that may more accurately or completely represent the product for which the user is searching. The SES 160 generates the query suggestions from an analysis of User Generated Content ("UGC") accessible on the Internet. The content may be product-related blogs, user reviews, product question and answer articles, or other product-related content that is user generated. Block 220 will be discussed in more detail with reference to FIG. 3, which depicts a method 220 for a SES to offer query suggestions based on UGC according to an exemplary embodiment.

In block 225, the user 101 selects one of the suggested queries to search. The user 101 may alternately ignore the suggested queries and search based on the original keywords or any alternate user entry.

In block 230, the SES 160 will complete the search based on the selection of the user. The results of the search are displayed on the user interface of the online shopping website 153. The user 101 may select the result that most closely matches the product for which the user 101 was shopping. In certain exemplary embodiments, the SES 160 communicates the search results to the user device 110, which presents the search results to the user 101 via a user interface of the user device 110.

FIG. 3 is a flow chart depicting a method 220 for an SES 160 to offer query suggestions based on UGC, in accordance with certain exemplary embodiments.

With reference to FIGS. 1 and 3, in block 305, the SES 160 installs computer-readable program instructions on the SES server 161 for interacting with the online shopping website 153 of the OSS 150. Additionally, the OSS 150 installs computer-readable program instructions on the OSS server 151 for interacting with the SES 160. In an exemplary embodiment, these computer-readable program instructions may be implemented as an embedded script, such as JavaScript, in the OSS server 151. The OSS 150 may display a user interface of the SES 160 while the SES 160 maintains all of the searching functions on the SES server 161. Alternately, the OSS 150 may embed the SES 160 as an application operating on the OSS server 161 and displaying on the OSS website 153.

The SES server 161 also comprises computer-readable program instructions to interact with the UGC 140 via the network 105.

In block 310, the SES 160 monitors the user interface keyword entry location on the OSS website 153 and receives the keywords entered by the user 101. In certain exemplary embodiments when the user 101 conducts a search via a search engine that searches multiple merchant online shopping systems 150, the user may submit the keywords for the search query directly into the SES 160, in which case the SES 160 also may perform functions of the OSS 150 described herein.

In block 315, the SES 160 searches the Internet for UGC relating to the product represented by the keywords. The content may be product-related blogs, user reviews, product question and answer articles, or other product-related content that is user generated. The UGC may reside on a UGC system server 141 and be accessible through the UGC website 143.

The method 220 employs UGC in the exemplary embodiment to access the features of the product being searched that are most relevant to the user 101. As the UGC is provided by users of the product, the content may be particularly relevant to the users' experience and thus may provide query content that may be more applicable to a new user 101 searching for that product than a query based on historical keyword entries. Additionally, the UGC system server 161 may search the Internet for other information represented by the keywords, such as merchant web sites.

In block 320, the SES 160 extracts bigrams from the UGC. The bigrams extracted may be two-word combinations that are repeated often in the UGC. An exemplary embodiment may require that the number of occurrences of the bigrams be above a configurable threshold to be included in the extracted bigram list. The threshold can be established to capture word combinations that statistically represent a useful result for the query. In alternative embodiments, the SES 160 may extract words or phrases other than two-word bigrams. For example, the SES 160 may extract single word unigrams, three-word trigrams, or any other length that statistically represents a useful result for the query. Longer word combinations, such as trigrams or four-grams, may provide more meaningful results. However, longer word combinations may result in a reduction in the total number of word combinations extracted. Fewer word combinations may limit the usefulness of the queries generated. The length of the word combinations can be configured to obtain a desired accuracy of the results.

In block 325, the SES 160 generates a list of composite phrases by combining the bigrams into different order combinations. That is, one or more words of each bigram are combined with one or more words from other extracted bigrams to form new composite phrases. When a duplicate to an extracted word combination is generated, the SES 160 eliminates the duplicate. The SES 160 then evaluates the relevance of each new composite phrase. For example, the SES 160 may evaluate the relevance of each new composite phrase by counting the occurrences of the phrase in the UGC, similar to evaluating the relevance of the extracted word combinations. In an exemplary embodiment, the words of the phrase must appear in a sentence or other portion (for example, a paragraph, table, chart, or the entire contents of a particular item) of the UGC in the same order as the composite phrase to be considered an occurrence. Alternatively, this action may still be considered an occurrence even if the words are not consecutive in a sentence, providing that the words of the phrase appear in the same order in the sentence or other portion of the UGC as ordered in the new composite phrase. If the composite phrase meets the predetermined threshold for occurrences, the composite phrase is added to the list of candidate queries.

In an alternate exemplary embodiment, the SES 160 may additionally generate new composite phrases of three or more words. The SES 160 may generate the candidate list of two word composite phrases as described in block 325 and add a third non-repeated word to the composite phrases. The third word added to the composite phrase may be selected from a different composite phrase on the candidate list of composite phrases. The newly generated three word composite phrase is evaluated in the same manner as the two word phrases in block 325. That is, the SES 160 may count the occurrences of the phrase in the UGC.

The SES 160 may additionally generate the candidate list of three word composite phrases as described in the alternate exemplary embodiment of block 325 and combine each composite phrase with one or more words in the extracted bigrams to form four word composite phrases. The fourth word added to the composite phrase may be a non-repeated word to the composite phrases. The newly generated four word composite phrase is evaluated in the same manner as the two word phrases in block 325. That is, the SES 160 may count the occurrences of the phrase in the UGC.

The SES 160 may continue the process and generate longer composite phrases until the count of occurrences fails to meet a predetermined threshold.

In block 330 the SES 160 selects a final query suggestion list. The SES 160 first sorts the composite phrases. Any phrases that contain duplicate words to another phrase, even if the words are in a different order, may be removed from the candidate list. A composite phrase that contains a word not found in any of the other composite phrases, but meeting the threshold of occurrences, can be added to the final query suggestion list to improve the diversity of the results. The remaining composite phrases are sorted according to the count of their occurrences in the original keywords search. The SES 160 compares the candidate list to the user interface on the OSS website 143 and determines the number of suggested queries that are needed. The interface may have a limit on the maximum number of suggested queries that the interface can display. The SES 160 may provide this number if the SES 160 has generated that quantity of acceptable suggested queries. If the SES 160 has not generated the maximum number of suggested queries that meet a predetermined threshold, only the number of qualified query suggestions may be provided to the user interface of the OSS website 143. The number of suggested queries may additionally or alternatively be determined by user configuration or any other suitable factor that may control the quantity of suggested queries.

In block 335, the user interface on the OSS website 143 displays the suggested queries to the user. For example, the OSS 150 can communicate the suggested queries to the user device 110 via the network 105 for presentation to the user 101. After block 335, the method 220 may proceed to block 225 of method 200 as referenced in FIG. 2.

General

Users may, in appropriate circumstances, limit or otherwise affect the operation of the features disclosed in the specification. For example, users may be given an initial opportunity to opt-in or opt-out of the collection or use of certain data or the activation of certain features. In addition, a user may change the manner in which the features are employed, including for situations in which a user may have concerns regarding his privacy. Instructions may be provided to users to notify the users regarding policies about the use of information, including personally identifiable information and receipt information, and manners in which the users may affect such use of information.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for offering suggested queries, comprising:

receiving, by a computer, a keyword or phrase for a search query;

searching, by the computer, electronic content of product review information for content related to the keyword or phrase;

extracting, by the computer, word combinations from the content, wherein the extracted word combinations are at least two word phrases that are repeated a predetermined number of times in the content;

combining, by the computer, one or more words from each extracted word combination with one or more words from other extracted word combinations to form composite phrases;

identifying, by the computer, each of the composite phrases that are repeated a predetermined number of times in the content;

ranking, by the computer, the identified composite phrases based on a number of occurrences of each of the identified composite phrases in the content;

selecting, by the computer, query suggestions from the ranked composite phrases by selecting a defined quantity of query suggestions in order of the ranking; and presenting, by the computer, the selected query suggestions.

2. The computer-implemented method of claim 1, wherein the electronic content comprises user generated content.

3. The computer-implemented method of claim 1, wherein the word combinations extracted by the computer are word combinations comprising three or more words.

4. The computer-implemented method of claim 1, wherein the composite phrases are further combined with non-redundant words from other composite phrases from the identified composite phrases to form aggregated composite phrases.

5. The computer-implemented method of claim 1, further comprising including, by the computer in the selected query suggestions, a particular composite phrase containing a word not duplicated in any of the other composite phrases despite the ranking of the particular composite phrase.

6. The computer-implemented method of claim 1, further comprising removing, by the computer, a particular composite phrase from the identified composite phrases if all words in the particular composite phrase are included in, but in a different order than, a separate one of the identified composite phrases.

7. The computer-implemented method of claim 1, wherein the extracted word combinations comprise words that are not necessarily adjacent to each other in the content.

8. A computer program product, comprising:

a non-transitory computer-readable medium having computer-readable program instructions embodied therein to offer to a user suggested queries based on electronic content, the computer-readable program instructions comprising:

computer-readable program instructions to receive a keyword or phrase for a search query;

computer-readable program instructions to search electronic content of product review information for content related to a keyword or phrase;

computer-readable program instructions to extract word combinations from the content, wherein the extracted word combinations are at least two word phrases that are repeated a predetermined number of times in the content;

computer-readable program instructions to combine one or more words from each extracted word combination with one or more words from other extracted word combinations to form composite phrases;

computer-readable program instructions to identify each of the composite phrases that are repeated a predetermined number of times in the content;

computer-readable program instructions to rank the identified composite phrases based on a number of occurrences of each of the identified composite phrases in the content; and computer-readable program instructions to select the identified composite phrases based on a number of occurrences of each of the identified composite phrases in the content.

9. The computer program product of claim 8, wherein the electronic content comprises user generated content.

10. The computer program product of claim 8, further comprising computer-readable program instructions to present the selected query suggestions.

11. The computer program product of claim 8, wherein the word combinations extracted by the computer are word combinations comprising three or more words.

12. The computer program product of claim 8, wherein the composite phrases are further combined with non-redundant words from other composite phrases from the identified composite phrases to form aggregated composite phrases.

13. The computer program product of claim 8, further comprising:
   computer-readable program instructions to include, in the selected query suggestions, a particular composite phrase containing a word not duplicated in any of the other composite phrases despite the ranking of the particular composite phrase.

14. The computer program product of claim 8, further comprising:
   computer-readable program instructions to remove a particular composite phrase from the identified composite phrases if all words in the particular composite phrase are included in, but in a different order than, a separate one of the identified composite phrases.

15. The computer program product of claim 8, wherein the extracted word combinations comprise words that are not necessarily adjacent to each other in the content.

16. An system for offering suggested queries, the system comprising:
   a network device comprising a processor, a memory, and an application executed by the processor and accessing the memory, the application being configured to:
   receive a keyword or phrase for a search query;
   search online user generated content of product review information for content related to the keyword or phrase;
   extract word combinations from the user generated content, wherein the extracted word combinations are at least two word phrases that are repeated a predetermined number of times in the content;
   combine one or more words from each extracted word combination with one or more words from other extracted word combinations to form composite phrases;
   identify each of the composite phrases that are repeated a predetermined number of times in the content;
   rank the identified composite phrases the number of occurrences in the search of user generated content;
   select query suggestions from the ranked composite phrases by selecting a defined quantity of query suggestions in order of the ranking; and
   present selected query suggestions.

17. The system of claim 16, wherein the word combinations extracted by the computer are word combinations comprising three or more words.

18. The system of claim 16, wherein the composite phrases are further combined with non-redundant words from other composite phrases from the identified composite phrases to form aggregated composite phrases.

19. The system of claim 16, wherein the application is further configured to include, in the selected query suggestions, a particular composite phrase containing a word not duplicated in any of the other composite phrases despite the ranking of the particular composite phrase.

20. The system of claim 16, wherein the application is further configured to remove a particular composite phrase from the identified composite phrases if all words in the particular composite phrase are included in, but in a different order than, a separate one of the identified composite phrases.

\* \* \* \* \*